United States Patent [19]

Uchino et al.

[11] Patent Number: 4,565,675
[45] Date of Patent: Jan. 21, 1986

[54] PROCESS FOR TREATING AND RECOVERING PICKLING WASTE LIQUIDS FOR STAINLESS STEEL

[75] Inventors: Kazuhiro Uchino; Toshio Watanabe, both of Chiba; Yoshio Nakazato, Tokyo; Minoru Hoshino; Noboru Ishihara, both of Chiba, all of Japan

[73] Assignees: Kawasaki Steel Corporation, Kobe; Research Development Corporation; Solex Research Corporation of Japan, both of Tokyo, all of Japan

[21] Appl. No.: 713,870

[22] Filed: Mar. 20, 1985

[30] Foreign Application Priority Data

Mar. 30, 1984 [JP] Japan .................................. 59-62435

[51] Int. Cl.$^4$ ...................... C01G 49/02; C01G 53/04; C01G 37/02
[52] U.S. Cl. .................................... 423/140; 423/151; 423/166; 423/390; 423/483; 423/488; 423/522; 423/555; 423/632; 423/DIG. 1; 423/DIG. 2
[58] Field of Search ............... 423/140, 151, 166, 390, 423/483, 488, 522, 555, 632, DIG. 1, DIG. 2

[56] References Cited

U.S. PATENT DOCUMENTS 3,927,173 12/1975 Melzer ...................... 423/DIG. 1 X
4,166,098 8/1979 Watanabe et al. .............. 423/390 X Primary Examiner—Patrick P. Garvin
Attorney, Agent, or Firm—Balogh, Osann, Kramer, Dvorak, Genova & Traub

[57] ABSTRACT

A process for treating and recovering pickling waste liquids used for the pickling of stainless steel such as nitric-hydrofluoric acid, nitric acid, hydrochloric acid and, sulfuric acid is disclosed, which comprises recovering the nitric-hydrofluoric acid and the iron oxide or metallic ion from the waste liquids of nitric-hydrofluoric acid and nitric acid by two solvent extraction processes and recovering the Cr and Ni containing ferrite from the waste liquids of sulfuric acid or hydrochloric acid by a ferrite formation process. When the waste acid is sulfuric acid, gypsum of a high purity can be obtained.

2 Claims, 1 Drawing Figure

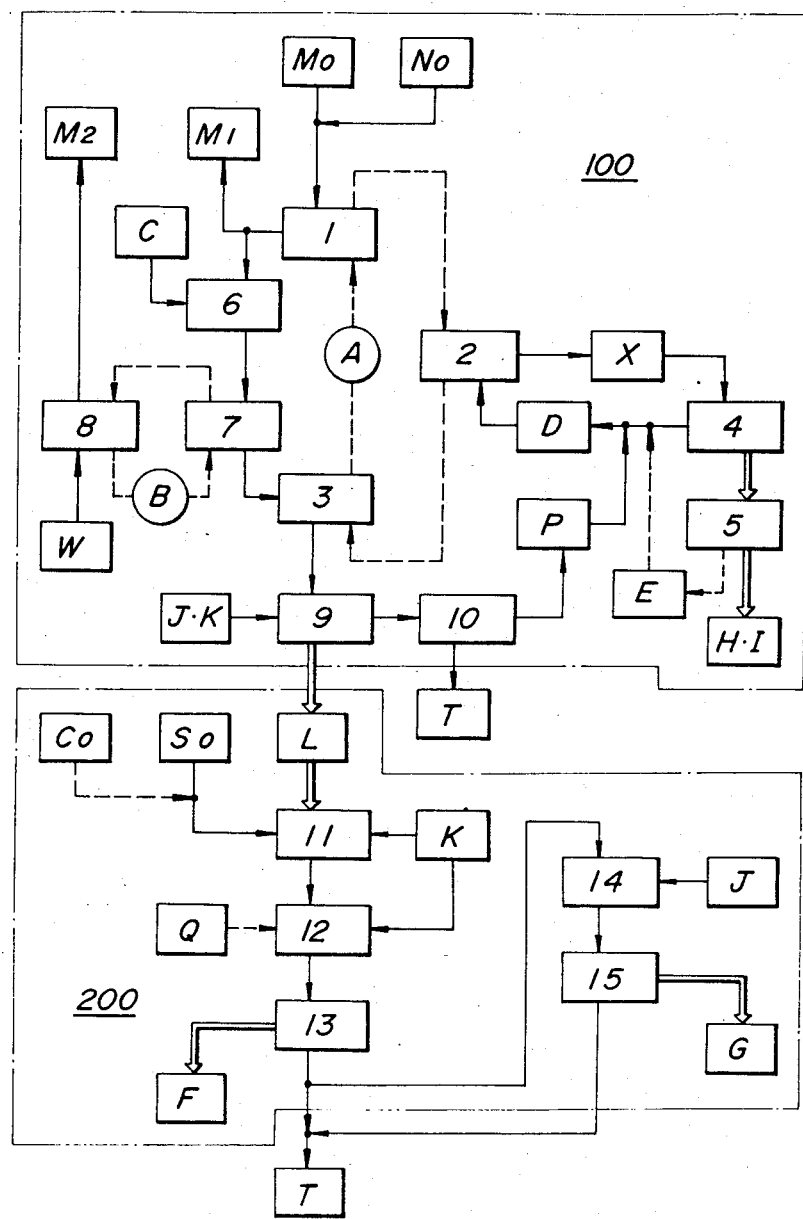
FIG_1

PROCESS FOR TREATING AND RECOVERING PICKLING WASTE LIQUIDS FOR STAINLESS STEEL

BACKGROUND OF THE INVENTION

1. Field of the Invention

The present invention relates to a process for treating and recovering a pickling waste liquid for stainless steel, particularly nitric-hydrofluoric acid, nitric acid, sulfuric acid or hydrochloric acid waste liquid containing ions of Fe, Cr and Ni used in the pickling of stainless steel sheet.

2. Description of the Prior Art

At the pickling step in the stainless steel making, solution of a mineral acid such as nitric-hydrofluoric acid, nitric acid, sulfuric acid, hydrochloric acid or the like is usually used, from which various pickling waste liquids containing ions of Fe, Cr and Ni are produced.

Heretofore, the treatment of nitric-hydrofluoric acid or nitric acid waste liquid has exclusively been performed through an alkali neutralizing process. In this case, sludges such as metal hydroxides and metal fluorides are produced in a large amount, and nitrogen content ($NO_3^-$) is discharged which is a cause of eutrophication in the public water area. Accordingly, it has been demanded to develop a technique for recovering nitric-hydrofluoric acid and metals from the waste liquid.

In this connection, a solvent extraction process is noted as a recovering technique. This technique is disclosed in Japanese Patent Application Publication No. 56-42,674, wherein $Fe^{3+}$ is first selectively extracted from the waste liquid of nitric-hydrofluoric acid with an organic solvent containing alkyl phosphoric acid. The thus extracted $Fe^{3+}$ is stripped by a process using an aqueous solution of fluoride series as described in Japanese Patent laid-open No. 57-42,545 and recovered as an iron oxide or a metallic iron by a process as described in Japanese Patent laid-open No. 58-15,039 or Japanese Patent Application Publication No. 58-12,323. On the other hand, at least an equivalent amount of sulfuric acid or hydrochloric acid is added to metal ions contained in the waste liquid after the extraction of Fe, and then the nitric-hydrofluoric acid is recovered with an organic solvent containing a neutral phosphate ester. According to this process, the nitric-hydrofluoric acid can be reused in a high yield, but the problem still remains in the treatment for ions of Ni and Cr included in the residual liquid after the extraction of nitric-hydrofluoric acid. For example, if it is intended to recover Ni and Cr by solvent extraction process or the like, the recovering step becomes complicated.

And also, the treatment for sulfuric acid or hydrochloric acid waste liquid has hitherto been carried out by the alkali neutralizing process. In this case, however, the cost in the oxidation of $Fe^{2+}$ becomes expensive and a large amount of hydroxide sludge is produced and is difficult to effectively use. Accordingly, aiming at the presence of $Fe^{2+}$ in the sulfuric acid or hydrochloric acid waste liquid, there has been proposed such a technic that this metal ion is recovered together with ions of Cr and Ni as ferromagnetic oxide by a ferrite formation process as shown in Japanses Patent Application Publication No. 51-22,307. The thus recovered ferrite is useful for a radio wave absorber and a vibration damper and has a high additional value. However, this ferrite formation process is inapplicable to the treatment of nitric acid or nitric-hydrofluoric acid and produces a concentrated solution of sodium sulfate when being applied to the treatment of the sulfuric acid waste liquid. In the latter case, there is a drawback that when the resulting waste water is led to a treating equipment for usual lime neutralization, a gypsum is produced, resulting in the cause of troubles.

As mentioned above, the solvent extraction process can treat the nitric acid or nitric-hydrofluoric acid waste liquid, while the ferrite formation process can treat the sulfuric acid or hydrochloric acid waste liquid. However, it is customary to simultaneously use the nitric acid or nitric-hydrofluoric acid and the sulfuric acid or hydrochloric acid in the pickling step for stainless steel, so that it is desired to treat these waste liquids synthetically.

SUMMARY OF THE INVENTION

It is an object of the invention to solve the above drawbacks of the prior art, while retaining advantages thereof, and to provide a technique for treating a pickling waste liquid for stainless steel synthetically, recovering the nitric-hydrofluoric acid, the included metal ions and the like in the effectively reusable form, and preventing the water pollution.

According to the invention, there is the provision of a process for treating and recovering nitric-hydrofluoric acid, nitric acid and hydrochloric acid waste liquids used for the pickling of stainless steel, which comprises removing $Fe^{3+}$ from the nitric-hydrofluoric acid and nitric acid waste liquids by a solvent extraction process to recover it as an iron oxide or a metallic iron, recovering the nitric acid and the hydrofluoric acid by another solvent extraction process, converting the remaining ions of Cr and Ni into hydroxides by adding an alkali, and recovering them as ferromagnetic oxide by a ferrite formation process using the hydrochloric acid waste liquid as an acid for resolving the hydroxide and an iron source of $Fe^{2+}$.

According to the invention, there is also the provision of a process for treating and recovering nitric-hydrofluoric acid, nitric acid and sulfuric acid waste liquids used for the pickling of stainless steel, which comprises removing $Fe^{3+}$ from the nitric-hydrofluoric acid and nitric acid waste liquids by a solvent extraction process to recover it as an iron oxide or a metallic iron, recovering the nitric acid and the hydrofluoric acid by another solvent extraction process, converting the remaining ions of Cr and Ni into hydroxides by adding an alkali, recovering them as ferromagnetic oxide by a ferrite formation process using the sulfuric acid waste liquid as an acid for resolving the hydroxides and an ion source of $Fe^{2+}$, and recovering as a gypsum a sulfate group included in the filtrate after the ferrite process.

BRIEF DESCRIPTION OF THE DRAWING

FIG. 1 is a flow diagram illustrating an embodiment of the process for treating and recovering pickling waste liquids for stainless steel according to the invention, which is composed of a solvent extraction step 100 and a ferrite forming step 200.

DETAILED DESCRIPTION OF THE INVENTION

FIG. 1 is a flow diagram illustrating one embodiment of the procedure of the present invention, which is divided into a solvent extraction step 100 and a ferrite forming step 200 but constitutes one flow as a whole.

The nitric-hydrofluoric acid waste liquid Mo and the nitric acid waste liquid No are mainly treated at a solvent extraction step. Mo or a mixture of Mo and No mainly contains $Fe^{3+}$ in the form of $FeF_2^+$, from which the iron is removed at 1 by an ion exchange reaction with an organic solvent A containing an alkyl phosphoric acid (hereinafter abbreviated as HR) as an extractant. A typical example of the alkyl phosphoric acid is di-(2-ethylhexyl)phosphoric acid (which is abbreviated as D2EHPA).

$$FeF_2^+ + 3HR \rightarrow FeR_3 + H^+ + 2HF \quad (1)$$

$$FeF_2^+ + Hr \rightarrow FeF_2R + H^+ \quad (2)$$

The solvent A containing the extracted $Fe^{3+}$ is reacted at 2 with a stripping solution D consisting mainly of $NH_4HF_2$ to form a crystal X of $(NH_4)_3FeF_6$.

$$FeR_3 + 3NH_4HF_2 \rightarrow 3HR + (NH_4)_3FeF_6 \downarrow \quad (3)$$

$$FeF_2R + 3NH_4HF_2 \rightarrow HR + (NH_4)_3FeF_6 \downarrow + 2HF \quad (4)$$

$$FeR_3 + 3NH_4HF_2 + 3NH_4F \rightarrow \quad (5)$$
$$3NH_4R + (NH_4)_3FeF_6 \downarrow + 3HF$$

A part of the extractant after the stripping of the iron is in an ammonia form ($NH_4R$) as shown in the equation (5), so that it is converted by contacting with an aqueous phase containing hydrochloric acid at 3. The solvent A containing the extractant converted into a hydrogen form (HR) is again used for the extraction of iron at 1.

The stripping solution containing the crystal X is subjected to a liquid-solid separation at 4, and then the crystal X is decomposed into an iron oxide H or a metallic iron I in air or a hydrogen stream at 5.

$$(NH_4)_3FeF_6 + \tfrac{3}{2}O_2 \rightarrow 3NH_4F + 3/2F_2 + \tfrac{1}{2}Fe_2O_3 \quad (6)$$

$$(NH_4)_3FeF_6 + 3/2H_2 \rightarrow 3NH_4F + 3HF + Fe \quad (7)$$

The decomposition gas E produced at 5 contains $NH_4F$, HF and the like, so that it is absorbed and reused as the stripping solution D. The crystal X formed by the reaction at 2 has a high purity as $(NH_4)_3FeF_6$, so that the resulting product H or I has also a high purity.

On the other hand, a part of the waste acid after the extraction of the iron is returned to a nitric-hydrofluoric acid pickling tank as an iron-free acid $M_1$ for reuse, while the remainder is led to a system for recovering nitric-hydrofluoric acid, the ratio of which is determined so that the amounts of Cr and Ni included therein may be balanced with the dissolving amounts of Cr and Ni in the nitric-hydrofluoric acid pickling tank. First of all, the metal nitrates are converted into chlorides by the addition of hydrochloric acid C at 6, which is then contacted with an organic solvent B containing a neutral phosphate ester as an extractant at 7 to extract the nitric acid and the hydrofluoric acid. Tributyl phosphate (TBP) is a typical example of the neutral phosphate ester.

$$HNO_3 + TBP \rightleftharpoons HNO_3 \cdot TBP \quad (8)$$

$$HF + TBP \rightleftharpoons HF \cdot TBP \quad (9)$$

The nitric acid and hydrofluoric acid extracted in the solvent B are stripped at 8 with water W to recover a mixed acid $M_2$, which is reused in the nitric-hydrofluoric acid pickling tank.

The aqueous phase (raffinate) after the extraction of nitric-hydrofluoric acid at 7 contains hydrochloric acid, so that it is used for the conversion of the solvent A ($NH_4R \rightarrow HR$) at 3 as mentioned above and as a result contains $NH_4^+$. Now, such an aqueous phase is neutralized at 9 with aqueous solutions of calcium chloride J and sodium hydroxide K to obtain a hydroxide slurry L composed mainly of Cr and Ni. The supernatant liquid is fed to a waste water treating equipment T after the recovery of ammonia water P at 10. The ammonia water P is reused for adjusting the concentration of the stripping solution and the like.

The above procedures are included in the solvent extraction step 100.

The hydroxide slurry L produced at 9 and composed mainly of Cr and Ni is fed to a subsequent ferrite formation step 200, at where it is treated together with the sulfuric acid waste liquid So or the hydrochloric acid waste liquid Co. L and So or Co are mixed with an aqueous solution K of sodium hydroxide at 11, whereby the hydroxides of Cr and Ni are resolved by the acid content and neutralized together with $Fe^{2+}$ to form a composite hydroxide. An embodiment of the reaction equation is shown as follows.

$$(3-y-z)Fe^{2+} + yCr^{3+} + zNi^{2+} + (6+y)OH^- \rightarrow Ni_zFe_{3-y-z}Cr_y(OH)_{6+y} \quad (10)$$

wherein $0 \leq y < 2$ and $0 \leq z \leq 1$. Then, the aqueous solution K of sodium hydroxide is added at a liquid temperature of 60°–80° C. at 12 and air Q is blown thereinto while retaining the pH value of 9–11, whereby a part of $Fe^{2+}$ in the composite hydroxide is oxidized into $Fe^{3+}$ to form a ferromagnetic spinel compound (ferrite).

$$Ni_zFe_{3-y-z}Cr_6(OH)_{6+y} + (\tfrac{1}{2} - y/4)O_2 \rightarrow Ni_zFe_{3-y-z}Cr_yO_4 + (3+y/2)H_2O \quad (11)$$

This reaction liquid is treated by settling and magnetic separation at 13 to obtain a ferrite F. The supernatant liquid is fed to the waste water treating equipment T when the waste acid is the hydrochloric acid waste liquid Co. While, when it is the sulfuric acid waste liquid So, the supernatant liquid contains $SO_4^{2-}$, so that it is added with calcium chloride J at 14 to form a gypsum G and then the gypsum G is separated at 15, after which the resulting filtrate is fed to the waste water treating equipment T.

$$Na_2SO_4 + CaCl_2 + 2H_2O \rightarrow CaSO_4 \cdot 2H_2O + 2NaCl \quad (12)$$

The resulting gypsum G does not substantially contain any metal besides Ca, so that the whiteness is high.

As explained above in detail, the feature of the invention lie in the synthetic treatment and the effective recovery of various waste acids produced in the pickling step for stainless steel by using two solvent extraction processes and a ferrite formation process. That is, the nitric-hydrofluoric acid and the iron oxide or metallic iron of a high purity can be recovered from the nitric-hydrofluoric acid and nitric acid waste liquids, while the Cr and Ni containing ferrite can be obtained from the sulfuric acid and hydrochloric acid waste liquids and particularly gypsum of a high purity can be obtained in case of the sulfuric acid waste liquid. Additionally, the invention takes care of prevention of the water pollution due to the discharge of nitrogen content ($NO_3^-$) and fluorine content ($F^-$) and thus can be said to be an excellent waste acid treating technique in environmental control.

The following examples are given for the purpose of illustration of the invention and are not intended as limitations thereof.

EXAMPLE 1

A waste liquid was treated at a rate of 1 m$^3$/hr in a recovery equipment having a treatment capacity for nitric-hydrofluoric acid waste liquid of 1 m$^3$/hr. The composition of the waste liquid was as follows:

$Fe^{3+} = 39.0$ g/l,
$Cr^{3+} = 9.9$ g/l,
$Ni^{2+} = 4.5$ g/l,
$HNO_3 = 180$ g/l, and
$HF = 44$ g/l.

This waste liquid was subjected to an iron extraction with an organic solvent A consisting of 30 v/v% of D2EHPA and 70 v/v% of n-paraffin at a flow rate of aqueous phase to organic phase of O/A=2.2 by means of a four-step mixer-settlers. The concentration of $Fe^{3+}$ in the organic phase after the extraction of iron was 17.6 g/l and the concentrations of $Fe^{3+}$ and HF in the aqueous phase were 0.02 g/l (the extraction rate of $Fe^{3+}$ was 99.9%) and 35 g/l, respectively.

The organic solvent A containing 17.6 g/l of the extracted $Fe^{3+}$ was fed to a crystallizer having a crystal producing capability of 45 t/month, at where it was mixed with a solution of 125 g/l of $NH_4HF_2$ at a flow rate O/A=1/1.75 to strip $Fe^{3+}$ and to obtain a white crystal of $(NH_4)_3FeF_6$. This crystal was fired at 450°-550° C. in a rotary kiln having a production capability of iron oxide of 15 t/month. The resulting iron oxide contained 0.30% of phosphorus and 10.0% of fluorine. By refiring the iron oxide at 800° C., the phosphorus and fluorine contents were reduced to 0.21% and not more than 0.02%, respectively, and the purity as $Fe_2O_3$ was not less than 99.5%.

After the iron extraction, nitric-hydrofluoric acid was extracted at a rate of 0.3 m$^3$/hr from the waste acid ($Fe^{3+} = 0.02$ g/l, $Cr^{3+} = 9.9$ g/l, $Ni^{2+} = 4.5$ g/l, $HNO_3 = 180$ g/l, HF = 35 g/l). The organic solvent B was composed of 70 v/v% of TBP and 30 v/v% of n-paraffin. The extraction of nitric-hydrofluoric acid at O/A=3 and the stripping thereof at O/A=2.7 were carried out to obtain 153 g/l of $HNO_3$ (recovery 93.5%) and 25 g/l of HF (recovery 78.6%) as a recovered acid.

The aqueous phase (raffinate) after the extraction of nitric-hydrofluoric acid was neutralized with solutions of 35% $CaCl_2$ and 24% NaOH to obtain a hydroxide slurry having a water content of 78%.

EXAMPLE 2

The hydroxide slurry obtained in Example 1 was dried to obtain a cake having Cr content of 23.2% and Ni content of 10.6%. 25 g of the cake was charged into a four-necked round flask of 1 l capacity, to which 500 ml of the sulfuric acid waste liquid for stainless steel ($H_2SO_4 = 310$ g/l, $Fe^{2+} = 54$ g/l, $Cr^{3+} = 9$ g/l, $Ni^{2+} = 1$ g/l) was added and stirred with heating at 70° C., whereby the hydroxide was dissolved. Then, the resulting product was neutralized with a solution of 24% NaOH and then air was blown at a rate of 2 l/min for 3.5 hours, while holding a pH value of 10.8 at 70° C. This reaction liquid was filtrated to obtain a black powder having a saturation magnetization of 39 emu/g. It is clear that this powder is a ferromagnetic oxide of spinel type from the result of a X-ray diffraction.

The above filtrate was colorless and transparent, to which was added a solution of 20% $CaCl_2$ to obtain a purely white gypsum having a water content of 6.2%.

What is claimed is:

1. A process for treating and recovering nitric-hydrofluoric acid, nitric acid and hydrochloric acid waste liquids used for the pickling of stainless steel, which comprises removing $Fe^{3+}$ from the nitric-hydrofluoric acid and nitric acid waste liquids by a solvent extraction process to recover it as an iron oxide or a metallic iron, recovering the nitric acid and the hydrofluoric acid by another solvent extraction process, converting the remaining ions of Cr and Ni into a hydroxide by adding an alkali, and recovering them as ferromagnetic oxides by a ferrite formation process using the hydrochloric acid waste liquid as an acid for resolving the hydroxide and an ion source of $Fe^{2+}$.

2. A process for treating and recovering nitric-hydrofluoric acid, nitric acid and sulfuric acid waste liquids used for the pickling of stainless steel, which comprises removing $Fe^{3+}$ from the nitric-hydrofluoric acid and nitric acid waste liquids by a solvent extraction process to recover it as an iron oxide or a metallic iron, recovering the nitric acid and the hydrofluoric acid by another solvent extraction process, converting the remaining ions of Cr and Ni into a hydroxide by adding an alkali, recovering them as ferromagnetic oxides by a ferrite formation process using the sulfuric acid waste liquid as an acid for resolving the hydroxide and an ion source of $Fe^{2+}$, and recovering as a gypsum a sulfate group included in the filtrate after the treatment for the ferrite formation process.

* * * * *